United States Patent
Corrigan et al.

(10) Patent No.: US 6,430,958 B1
(45) Date of Patent: Aug. 13, 2002

(54) SUCTION ACCUMULATOR FOR AIR CONDITIONING SYSTEMS

(75) Inventors: Daniel Leonard Corrigan, Kingston; Kenneth Peter Luke Cram, Belleville, both of (CA)

(73) Assignee: Halla Climate Control Canada, Inc., Belleville (CA)

( * ) Notice: Subject to any disclaimer, the term of this patent is extended or adjusted under 35 U.S.C. 154(b) by 0 days.

(21) Appl. No.: 09/766,967

(22) Filed: Jan. 22, 2001

(51) Int. Cl.⁷ ................................................. F25B 43/00
(52) U.S. Cl. ............................... 62/503; 62/511; 62/83; 62/174
(58) Field of Search .......................... 62/503, 511, 83, 62/174

(56) References Cited

U.S. PATENT DOCUMENTS

| | | |
|---|---|---|
| 4,111,005 A | 9/1978 | Livesay |
| 4,229,949 A | 10/1980 | Brandin |
| 4,270,934 A | 6/1981 | Widdowson et al. |
| 4,458,505 A * | 7/1984 | Griffin .................... 62/503 |
| 4,474,035 A | 10/1984 | Amin et al. |
| 4,651,540 A | 3/1987 | Morse |
| 4,768,355 A | 9/1988 | Breuhan et al. |
| 4,994,185 A | 2/1991 | Cullen et al. |
| 5,021,792 A | 6/1991 | Hwang |
| 5,177,982 A | 1/1993 | Plemens |
| 5,179,844 A | 1/1993 | Lyman et al. |
| 5,184,479 A | 2/1993 | Koberstein et al. |
| 5,201,792 A | 4/1993 | Study |
| 5,471,854 A | 12/1995 | Denolf |
| 5,479,790 A | 1/1996 | Bottum, Jr. et al. |
| 5,570,589 A * | 11/1996 | Petty ........................... 62/471 |
| 5,660,058 A | 8/1997 | Harris et al. |
| 5,701,758 A | 12/1997 | Haramoto et al. |
| 5,729,998 A | 3/1998 | Grohs et al. |
| 5,746,065 A | 5/1998 | Patel et al. |
| 5,778,697 A | 7/1998 | Wantuck |
| 5,787,729 A * | 8/1998 | Wijaya ........................ 62/503 |
| 5,904,055 A * | 5/1999 | Slais ............................ 62/503 |
| 6,167,720 B1 | 2/2001 | Chisnell |

* cited by examiner

*Primary Examiner*—William Doerrler
*Assistant Examiner*—Mark Shulman
(74) *Attorney, Agent, or Firm*—Baker & Daniels

(57) ABSTRACT

A deflector for use in an accumulator that provides a reservoir for the liquid-phase of a heat transfer medium circulating in a closed-loop air conditioning system is configured to prevent liquid phase medium from the supply pipe from entering the inlet area of the delivery pipe of the accumulator. The deflector has a recessed underside defined by a depending peripheral skirt having an outline that is closely spaced with respect to the peripheral wall of the accumulator to define therewith an annular gap. The upper wall of the deflector is positioned to be impinged by medium delivered from the supply pipe and is configured to distribute radially and impart rotation to the medium, thus enhancing the separation of the liquid phase along the accumulator peripheral wall, especially as the liquid and gaseous phase pass through the annular gap. The open inlet area of the delivery pipe is shielded within the recessed underside of the deflector.

9 Claims, 3 Drawing Sheets

SUCTION ACCUMULATOR FOR AIR CONDITIONING SYSTEMS

BACKGROUND OF THE INVENTION (a) Field of the Invention

This invention relates to a new or improved suction accumulator for use in air-conditioning systems including refrigeration systems and heating systems that include a heat pump.

(b) Description of the Prior Art

Closed-loop refrigeration systems conventionally employ a compressor that draws in gaseous refrigerant at relatively low pressure and discharges hot refrigerant at relatively high pressure. The hot refrigerant condenses into liquid as it is cooled in a condenser. A small orifice or valve divides the system into high-pressure and low-pressure sides. The liquid on the high-pressure side passes through the orifice or valve and turns into a gas in the evaporator as it picks up heat. At low heat loads it is not desirable or possible to evaporate all the liquid. However, liquid refrigerant entering the compressor (known as "slugging" or "carryover") causes system efficiency loss and can cause damage to the compressor. Hence it is standard practice to include an accumulator between the evaporator and the compressor to separate and store the excess liquid.

An accumulator is typically a metal can, welded together, and often has fittings attached for a switch and/or charge port. One or more inlet tubes and an outlet tube pierce the top, sides, or occasionally the bottom, or attach to fittings provided for that purpose. The refrigerant flowing into a typical accumulator will impinge upon a deflector or baffle intended to reduce the likelihood of liquid flowing out the exit. There are many kinds of baffles and deflectors in the prior art, all designed to reduce liquid carryover (see for instance U.S. Pat. Nos. 5,78,7729, 5,471,854, 5,201,792, 5,184,479, 5,021,792, 4,768,355, 4,651,540, 4,270,934, and 4,229,949), and the prior art includes designs that claim not to need deflectors (U.S. Pat. Nos. 5,179,844, 5,471,854). However in current standard use most accumulators use a variation of the dome (U.S. Pat. No. 4474035) or "Dixie cup" (U.S. Pat. No. 4,111,005) deflector—usually because they are simple and cost-effective. The above mentioned patents are incorporated herein by reference, in their entirety. There remains a need for a deflector design that directs the flow of refrigerant in the best possible manner to separate the gas from the liquid and minimize liquid carryover.

SUMMARY OF THE INVENTION

The invention provides an accumulator providing a reservoir for liquid-phase of a heat transfer medium that circulates in a closed-loop air conditioning system, said accumulator comprising: a hollow container defined by a peripheral wall and closed upper and lower ends; a supply pipe for delivering the medium from an evaporator in mixed liquid/gaseous phase into an upper region of said container; a delivery pipe in said container for passing medium predominantly in gaseous phase, from said container to a compressor in said system, said delivery pipe having an open inlet area located in said upper region of said container; and a deflector positioned in said upper region, said deflector being configured to prevent liquid phase medium from said supply pipe from entering the inlet area of the delivery pipe; said deflector having a recessed underside defined by a depending peripheral skirt having an outline that is closely spaced with respect to said peripheral wall to define therewith an annular gap; said deflector skirt adjoining the periphery of an upper wall of the deflector, said upper wall being positioned to be impinged by medium delivered from said supply pipe and being configured to distribute radially and impart rotation to said medium, thus enhancing the separation of the liquid phase along the accumulator peripheral wall especially as the liquid and gaseous phase pass through the annular gap, the open inlet area of the delivery pipe being shielded within the recessed underside of the deflector. The deflector of the accumulator disclosed herein provides for rapid separation of the liquid and gas phases of the stream of refrigerant entering the accumulator through the supply pipe. The deflector prevents liquid refrigerant from entering the delivery tube inlet. To this end, the deflector preferably has an upper surface that is formed with a series of grooves or channels extending in spiral fashion from a central part thereof towards the periphery. The liquid and gaseous refrigerant impinging upon this upper surface are largely deflected outwards to the peripheral wall of the accumulator. In the prior art, utilizing a smooth deflector surface, some portion of the liquid phase would collect upon the wall and flow downwards through the annular gap between the deflector and peripheral wall. However, much of the liquid would remain entrained in (or be returned to) the gaseous stream and be transported into the delivery pipe. In the present invention the spiral grooves or channels on the deflector surface impart a rotation to the refrigerant stream as it is deflected. The higher centrifugal action of the denser liquid phase preferentially forces it to the peripheral wall, and the swirling of the liquid tends to keep it forced against the wall as the liquid flows downward through the annular gap between the wall and the deflector. The multiple spiral grooves tend to distribute the liquid evenly and ensure that rotation and radial motion will be imparted to all refrigerant impinging upon the deflector. The gas will also swirl smoothly through the annular gap, and the grooves on the underside of the deflector will tend to maintain this swirling and aid in the re-direction of the gas into the delivery tube inlet. The deflector thus effects superior separation of liquid and gaseous refrigerant, reducing liquid carryover, and smooths the gas flow, reducing deleterious suction-line pressure drop. The result is superior refrigeration system performance.

The outlet delivery tube may be of a conventional U-or J-shaped configuration, with one limb extending in an axial direction through hermetically sealed joints in the top of the accumulator and in the deflector, the other limb of the tube opening in a sheltered position beneath the deflector and the two limbs being joined through a curved bight portion located at the lower end of the accumulator. The configuration of this tube will vary depending on whether the tube is desired to exit the accumulator through the top, bottom, or side wall. Liquid refrigerant passing over the deflector will move under gravity to the lower end of the accumulator which constitutes a reservoir for the liquid. Compressor oil is contained in the liquid refrigerant, and it must be returned to the compressor. It is gradually entrained in known manner through a small orifice into the gas refrigerant stream that passes out of the accumulator through the U-tube.

The deflector may be fabricated in any suitable material such as aluminum, rubber, plastic, or composite material. The deflector may comprise or include material which acts as a desiccating element. The annular gap between the peripheral skirt of the deflector and the accumulator wall is preferably maintained by projecting ribs on the skirt which engage the wall and support the deflector relative thereto in rattle-free condition. It is preferable that these ribs are shaped to aid the swirling motion of the refrigerant flowing through the gap.

The inlet to the J-shaped delivery tube is preferably located in guides provided on the underside of the deflector, to maintain the position of the inlet with respect to the deflector, especially the spacing between the underside of the deflector and the inlet of the tube.

The deflector disclosed herein can be modified to suit any style of accumulator, including the "top in/top out" style as herein after illustrated and described, as well as other types of accumulator identified as top in/side out, top in/bottom out, side in/top out, side in/bottom out, or side in/side out. This can be effected by changing the delivery tube and the fit of the deflector with respect to the delivery tube to suit the particular application.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
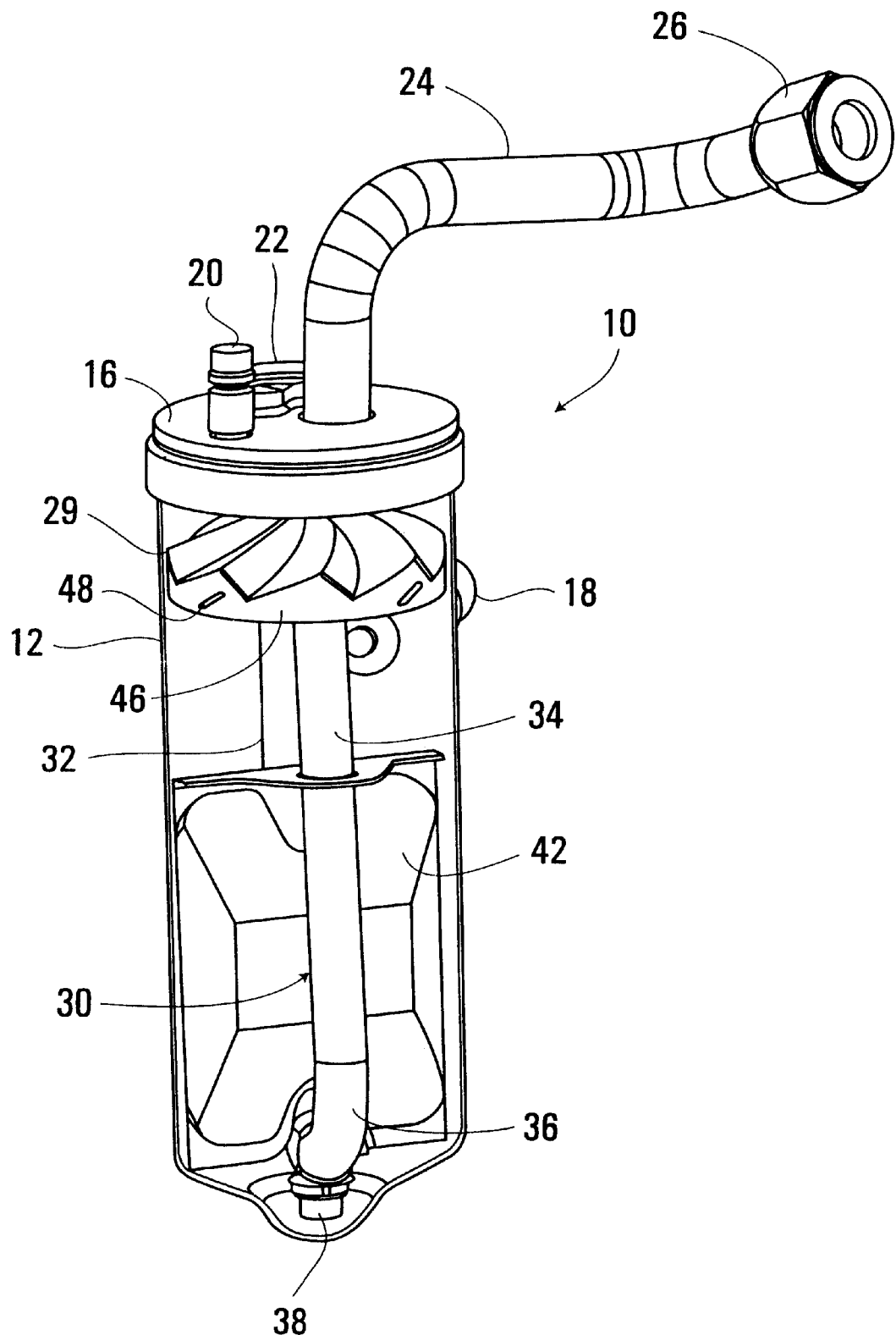
FIG. 1 is a partly fragmented perspective view of a preferred embodiment of air-conditioning accumulator in accordance with the present invention.

The accumulator 10 shown in FIG. 1 comprises a cylindrical body or can 12 having a closed lower end that is closed at its upper end by a disc-shaped top cap 16. A clutch cycling switch 18 of known design is located in the side wall 12. The top cap 16 is penetrated by a service stem 20, an outlet port 22 for connection to an outlet tube leading to a compressor (not shown) and an inlet tube 24 which carries a swivel nut connector 26 for attachment to an inlet tube or evaporator (not shown). The outlet port 22 is adapted to be connected to a tube leading to a compressor (not shown).

Within the upper end of the cylindrical body 12 there is positioned a deflector 29 arranged horizontally. The body 12 also encloses a U-shaped outlet delivery tube 30 having one limb 32 which passes through the deflector 29 and is connected to the outlet port 22, and a second limb 34 that opens on the underside of the deflector 29. The lower bend or bight portion 36 of the delivery tube incorporates an oil filter 38 which surrounds a small precision hole (not shown) in the lower end of the bight 36. This provides an oil bleed hole located at the lowest point of the delivery tube through which the small mount of lubricating oil contained within the system is recirculated from the accumulator into the refrigerant gas flow passing to the compressor. Typically the limbs 34 or 32 of the delivery tube provide a convenient attachment point for a container or bag or desiccant material 42, if such is required.

Figure 2:
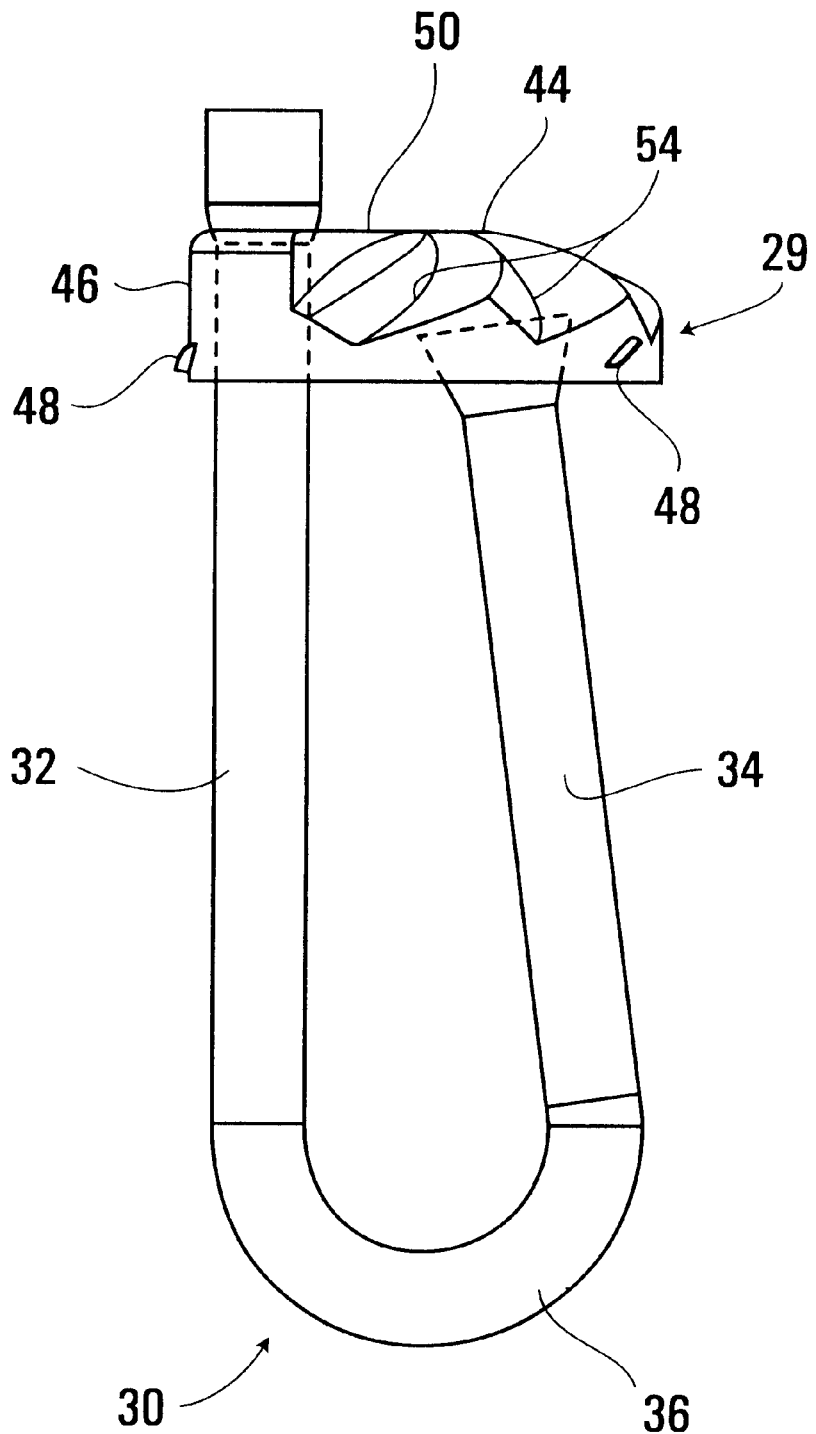
FIG. 2 is a side view of the deflector and delivery tube assembly of the accumulator drawn to a larger scale.
Figure 3:
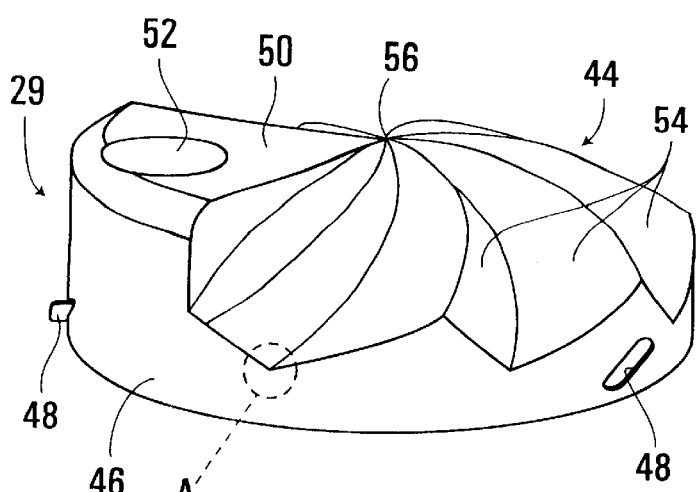
FIG. 3 is a perspective view of the deflector.
Figure 4:
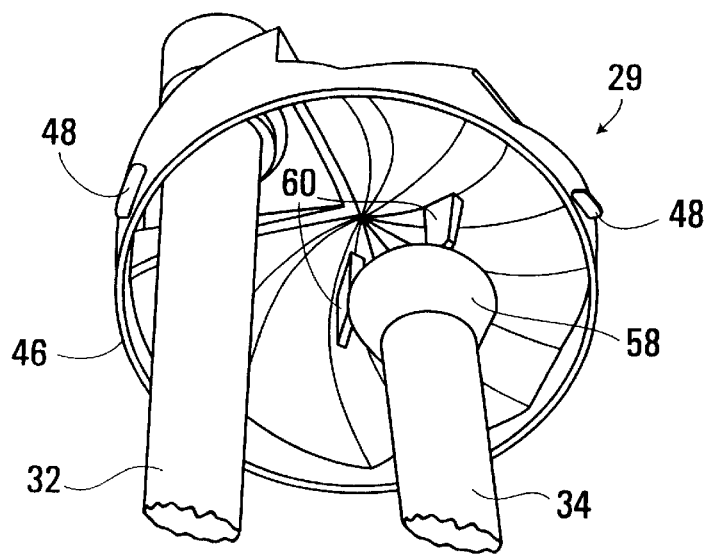
FIG. 4 is a fragmentary perspective view illustrating the underside of the deflector and delivery tube assembly of FIG. 2.

The configuration of the deflector 29 is best shown in FIGS. 2, 3 and 4 as comprising an upper wall 44 surrounded by an integral peripheral cylindrically curved skirt 46. A series of angularly spaced integral projecting ribs 48 extend obliquely thereon and engage snugly against the inner surface of the cylindrical body 12 thus maintaining the annular gap between this wall and the skirt 44 and retaining the deflector 29 in rattle-free condition with respect to the wall 12. The angular orientation of the ribs tends to enhance the swirling motion of the refrigerant as it passes through the annular gap.

In this embodiment the upper wall 44 of the deflector has a horizontal sector 50 formed with a bore 52 to allow the delivery tube to pass through the deflector. The remainder of the upper wall defines a topography of radially extending and expanding spiral V-shaped grooves 54 which from a center point 56 run downwardly and outwardly with a slight spiral swirl to the skirt 46.

Figure 4A:
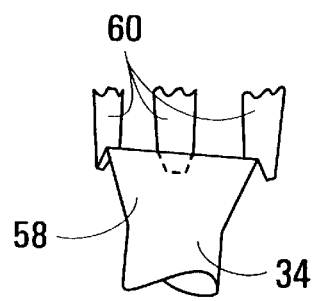
FIGS. 4A and 4B are fragmentary views showing the guides connecting the delivery tube and the deflector.

The underside of the deflector 29 is recessed and surrounds the upper end of the limb 34 of the outlet delivery tube, this upper end being defined by a bell shaped fitting 58 which seats against a series of supporting ribs 60 which are formed integrally with the underside of the deflector 29 as shown particularly in FIGS. 4 and 4A. The ribs 60 maintain the desired spacing of the bell end 58 with respect to the underside of the deflector while supporting it in rattle-free condition. The grooves on the underside of the deflector tend to aid the swirling and direction of the gases into the outlet delivery tube.

The accumulator 10 forms a sealed unit, there being hermetic seals between the cap 16 and the body 12 as well as between the cap and the fittings passing therethrough such as the service stem 20, the conduit leading from the outlet port 22 to the compressor (not shown) and the inlet tube 24. A snug fit is formed between the bore 52 in the deflector and the limb 32 of the delivery tube so that no liquid refrigerant will pass through this bore.

Figure 3A:
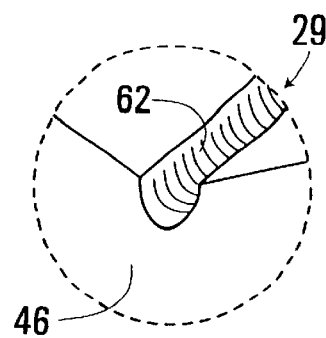
FIGS. 3A and 3B are enlarged fragmentary views illustrating the portion of the deflector indicated by the circle A in FIG. 3.
Figure 3B:
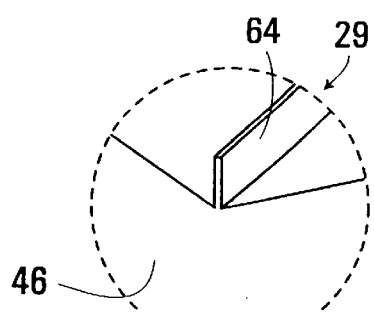

The topography of the upper wall 44 of the deflector 29 is such as to direct outwardly and downwardly the refrigerant that is delivered onto this top wall from the inlet pipe 24. This refrigerant will be a mixture of liquid and gaseous phases and it is important to reliably guide the liquid phase to the wall and thence to the bottom of the accumulator thus avoiding the risk that drops of liquid can be drawn into the open bell end 58 of the delivery tube 30. The grooves 54 achieve this effect by imparting spin to the liquid and gaseous refrigerant as it is deflected, so that the heavier liquid phase is forced preferentially to the wall. The grooves 54 extend outwardly and downwardly with a slight spiral curvature, as best seen in FIG. 3, to impart the angular movement to the refrigerant, this being enhanced by the angled ribs 48. Alternative arrangements to the wide V grooves 54 are shown in FIGS. 3A and 3B. In one configuration the grooves 54 are replaced by a series of radially and outwardly extending channels 62 as seen in FIG. 3A. In an alternative configuration, guidance of the liquid is effected by spirally arranged projecting ribs 64 on the top wall 44, as seen in FIG. 3B.

Figure 4B:
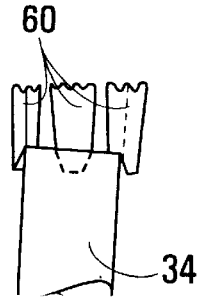

As an alternative to the bell end 58 of the outlet delivery tube limb 34, it may be provided with a plain end as seen in FIG. 4B, this end being engaged by slightly modified supporting ribs 66.

The accumulator can be fabricated from any suitable material that is convenient for the contemplated application. For automotive air-conditioning applications it is preferable to use a strong lightweight and non-corrosive material. For typical applications using hydrofluorocarbon refrigerant, the preferred material is aluminum.

The deflector likewise can be fabricated in any suitable material, and due to its relatively complex shape will most conveniently be manufactured as a plastic moulding, fabricated in a material that is compatible with the refrigerant and oil employed in the system. The preferred material is nylon however talc-filled polypropylene is generally adequate.

Whereas in the embodiment shown in FIG. 1 the clutch cycling switch 18 is located in the side wall 12 of the accumulator, this switch can be positioned in a different location as required. Likewise in the embodiment shown the service stem 20, the outlet port 22 and the connection for the inlet tube 24 are all provided in the top cap 16, one or more of these elements can be positioned in different locations in the can 12 as desired, as is known in the art.

It should be understood that while for clarity certain features of the invention are described in the context of separate embodiments, these features may also be provided in combination in a single embodiment. Furthermore, various features of the invention which for brevity are described in the context of a single embodiment may also be provided separately or in any suitable sub-combination in other embodiments.

Moreover, although particular embodiments of the invention have been described and illustrated herein, it will be recognized that modifications and variations may readily occur to those skilled in the art, and consequently it is intended that the claims appended hereto be interpreted to cover all such modifications and equivalents.

What is claimed is:

1. An accumulator providing a reservoir for liquid-phase of a heat transfer medium that circulates in a closed-loop air conditioning system, said accumulator comprising:

a hollow container defined by a peripheral wall and closed upper and lower end;

a supply pipe for delivering the medium from an evaporator in mixed liquid/gaseous phase into an upper region of said container;

a delivery pipe in said container for passing medium predominantly in gaseous phase, from said container to a compressor in said system, said delivery pipe having an open inlet area located in said upper region of said container; and a deflector positioned in said upper region, said deflector being configured to prevent liquid phase medium from said supply pipe from entering the inlet area of the delivery pipe;

said deflector having a recessed underside defined by a depending peripheral skirt having an outline that is closely spaced with respect to said peripheral wall to define therewith an annular gap; said deflector skirt adjoining the periphery of an upper wall of the deflector, said upper wall being positioned to be impinged by medium delivered from said supply pipe and being configured to include a plurality of channels on the upper side thereof, said channels extending both radially and peripherally with respect to the deflector to distribute radially and impart rotation to said medium, thus enhancing the separation of the liquid phase along the accumulator peripheral wall especially as the liquid and gaseous phase pass through the annular gap, the open inlet area of the delivery pipe being shielded within the recessed underside of the deflector.

2. An accumulator as claimed in claim 1 wherein said plurality of channels are defined between projecting ribs each extending radially and peripherally from a central area to the periphery of said deflector.

3. An accumulator as claimed in claim 1 wherein both said supply pipe and said delivery pipe pass through sealed openings in the upper end of the container, said delivery pipes being of generally U-shape having a curved bight that lies within the lower end of the container, said delivery pipe extending through a sealed opening in a lateral region of the upper wall of the deflector.

4. An accumulator as claimed in claim 1 wherein said upper wall of the deflector is configured with a series of V-shaped grooves which expand in size continuously towards the periphery.

5. An accumulator as claimed in claim 1 wherein said peripheral wall of the deflector includes projecting ribs that are adapted to engage the peripheral wall of the container to maintain said annular gap and to support the deflector in rattle-free condition with respect to said container.

6. An accumulator as claimed in claim 5 wherein said deflector is fabricated as a plastic moulding.

7. An accumulator as claimed in claim 1 wherein said upper wall of the deflector-is domed, being higher in its central area than at its periphery, and wherein the configuration to channel liquid phase medium comprises a series of radially outwardly and downwardly extending V-shaped grooves on the upper surface thereof.

8. An accumulator as claimed in claim 6 wherein said grooves extend in a somewhat spiral arrangement towards the periphery to provide a swirl to liquid medium passing therealong.

9. An accumulator as claimed in claim 1 wherein the recessed underside of the deflector has a plurality of channels, ribs or grooves extending from a central part towards the periphery thereof, better to swirl and direct the gaseous refrigerant into the open inlet area of the delivery pipe.

* * * * *